United States Patent
Guo et al.

(10) Patent No.: US 10,564,694 B2
(45) Date of Patent: Feb. 18, 2020

(54) POWER MANAGEMENT METHOD AND POWER MANAGEMENT APPARATUS FOR USER EQUIPMENT

(71) Applicant: Huawei Technologies Co., Ltd., Shenzhen (CN)

(72) Inventors: Yuhua Guo, Shanghai (CN); Shuaisheng Guo, Wuhan (CN); Shaoyong Niu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 15/529,436

(22) PCT Filed: Nov. 25, 2014

(86) PCT No.: PCT/CN2014/092194
§ 371 (c)(1),
(2) Date: May 24, 2017

(87) PCT Pub. No.: WO2016/082109
PCT Pub. Date: Jun. 2, 2016

(65) Prior Publication Data
US 2017/0329382 A1    Nov. 16, 2017

(51) Int. Cl.
*G06F 1/32* (2019.01)
*G06F 1/3203* (2019.01)
(Continued)

(52) U.S. Cl.
CPC ........ *G06F 1/3203* (2013.01); *G06F 1/3212* (2013.01); *G06F 1/3228* (2013.01)

(58) Field of Classification Search
CPC .................................... G06F 1/26; G06F 1/28
See application file for complete search history.

(56) References Cited

U.S. PATENT DOCUMENTS

2011/0040990 A1* 2/2011 Chan .................. G06F 1/28
713/300
2011/0099433 A1  4/2011 Matsui et al.
(Continued)

FOREIGN PATENT DOCUMENTS

CN    102369647 A    3/2012
CN    103324519 A    9/2013
(Continued)

OTHER PUBLICATIONS

Meeyeon et al., "Analysis of Characteristics of Power Consumption for Context-Aware Mobile Applications," Information vol. 5 No. 4, XP055386286, Open Access Information, (Nov. 14, 2014).

*Primary Examiner* — Mohammed H Rehman
*Assistant Examiner* — Keshab R Pandey
(74) *Attorney, Agent, or Firm* — Leydig, Voit & Mayer, Ltd.

(57) ABSTRACT

A power management method and a power management apparatus for terminal are disclosed. The method includes: obtaining a power consumption parameter of an application (101), where the application is installed in the terminal, the power consumption parameter is used to represent information about an amount of electricity consumed by a power consuming resource invoked by the application when the application is running, the power consuming resource includes a system resource of the terminal and/or a component resource of the terminal, the component resource is another hardware resource other than a processing resource in the terminal, and the system resource includes an operating system resource and/or a platform system resource of the terminal; determining a power consumption status of the application based on the power consumption parameter (102); and generating a power consumption report of the
(Continued)

application based on the power consumption status of the application (103).

16 Claims, 4 Drawing Sheets

(51) Int. Cl.
*G06F 1/3212* (2019.01)
*G06F 1/3228* (2019.01)

(56) References Cited

U.S. PATENT DOCUMENTS

| | | | |
|---|---|---|---|
| 2013/0067263 A1 | 3/2013 | Liu | |
| 2013/0173944 A1* | 7/2013 | Kohler | G06F 1/324 |
| | | | 713/324 |
| 2014/0019873 A1* | 1/2014 | Gupta | H04L 67/36 |
| | | | 715/744 |
| 2014/0173319 A1* | 6/2014 | Zeng | G06F 11/3013 |
| | | | 713/340 |
| 2014/0281648 A1* | 9/2014 | Russell | G06F 1/32 |
| | | | 713/340 |
| 2015/0026487 A1* | 1/2015 | Choi | G06F 9/4893 |
| | | | 713/300 |
| 2015/0293575 A1* | 10/2015 | Hampson | G06F 1/3212 |
| | | | 713/323 |
| 2016/0048682 A1 | 2/2016 | Gou et al. | |
| 2016/0124495 A1* | 5/2016 | Kim | H04W 52/0264 |
| | | | 713/323 |
| 2016/0252944 A1* | 9/2016 | Kim | G06F 1/28 |
| | | | 713/340 |
| 2017/0219367 A1* | 8/2017 | Liu | G06Q 50/10 |

FOREIGN PATENT DOCUMENTS

| | | |
|---|---|---|
| CN | 103885871 A | 6/2014 |
| JP | 2011095927 A | 5/2011 |
| JP | 2013502181 A | 1/2013 |
| WO | 2012153787 A1 | 11/2012 |
| WO | 2014183455 A1 | 11/2014 |

* cited by examiner

POWER MANAGEMENT METHOD AND POWER MANAGEMENT APPARATUS FOR USER EQUIPMENT

CROSS-REFERENCE TO RELATED APPLICATIONS

This application is a national stage of International Application No. PCT/CN2014/092194, filed on Nov. 25, 2014, which is hereby incorporated by reference in its entirety.

TECHNICAL FIELD

Embodiments of the present invention relate to the communications field, and more specifically, to a power management method and a power management apparatus for user equipment.

BACKGROUND

With development of communications technologies, functions of user equipment (UE, User Equipment) are richer. Many user equipments may provide a power management solution, for example, provide a power consumption statistics function, to help users obtain power consumption information of the user equipments. For example, an Android (Android) system can provide "battery information", and a user can view power consumption information of each application or process in "battery information", so as to learn an application that is a power consumption application. This type of power consumption statistics function may generally feed back a percentage of power consumption of each application in user equipment to total power consumption of the user equipment, or feed back an amount of electricity consumed by an operating system.

However, currently, a power consumption statistics function is implemented based on an occupancy rate and an occupancy time of an application to a central processing unit (CPU, Central Processing Unit), that is, statistics may be collected only on an amount of electricity consumed when the CPU runs the application. Therefore, only an application with "a high CPU occupancy rate and a long running time" may be listed. Statistics collected by this power consumption statistics function are not accurate.

SUMMARY

Embodiments of the present invention provide a power management method and a power management apparatus for user equipment, so as to provide a more accurate power consumption statistics result.

According to a first aspect, a power management method for user equipment is provided, including: obtaining a power consumption parameter of an application, where the application is installed in the user equipment, the power consumption parameter is used to represent information about an amount of electricity consumed by a power consuming resource invoked by the application when the application is running, the power consuming resource includes a system resource of the user equipment and/or a component resource of the user equipment, the component resource is another hardware resource other than a processing resource in the user equipment, and the system resource includes an operating system resource and/or a platform system resource of the user equipment; determining a power consumption status of the application based on the power consumption parameter; and generating a power consumption report of the application based on the power consumption status of the application.

With reference to the first aspect, in a first implementation manner of the first aspect, the power consumption report includes identification information of the application, and the power consumption report further includes one or more pieces of the following information: a power consumption level of the application, an amount of electricity consumed by the application, a percentage of the amount of electricity consumed by the application to a total amount of electricity consumed by the user equipment, or description information of a power consumption reason.

With reference to the first aspect or the first implementation manner of the first aspect, in a second implementation manner of the first aspect, the power consuming resource further includes the processing resource of the user equipment, the power consumption parameter is a quantity of times that the application regularly wakes up the user equipment, and the determining a power consumption status of the application based on the power consumption parameter includes: when the quantity of times is greater than or equal to a first threshold, determining that the application is in a high power consumption state.

With reference to the first aspect or the first implementation manner of the first aspect, in a third implementation manner of the first aspect, the power consuming resource further includes the processing resource of the user equipment, and the power consumption parameter is duration for which the application locks the user equipment to be in a waking state, and the determining a power consumption status of the application based on the power consumption parameter includes: when the duration is greater than or equal to a second threshold, determining that the application is in a high power consumption state.

With reference to the first aspect or the first implementation manner of the first aspect, in a fourth implementation manner of the first aspect, the power consuming resource further includes the processing resource of the user equipment, and the power consumption parameter is a quantity of times that the application automatically starts, and the determining a power consumption status of the application based on the power consumption parameter includes: when the quantity of times is greater than or equal to a third threshold, determining that the application is in a high power consumption state.

With reference to the first aspect or the first implementation manner of the first aspect, in a fifth implementation manner of the first aspect, the power consumption parameter is an amount of electricity consumed by a component invoked by the application, and the determining a power consumption status of the application based on the power consumption parameter includes: when the amount of electricity consumed by the component is greater than or equal to a fourth threshold, determining that the application is in a high power consumption state.

With reference to the fifth implementation manner of the first aspect, in a sixth implementation manner of the first aspect, the obtaining a power consumption parameter of an application includes: determining duration for which the component is invoked by the application; and obtaining, according to the duration for which the component is invoked by the application and a preset amount of electricity consumed by the component per unit time, the amount of electricity consumed by the component.

With reference to the fifth or the sixth implementation manner of the first aspect, in a seventh implementation manner of the first aspect, the component includes a Global Positioning System module, a mobile communications module, a wireless local area network communications module, or a backlight module.

With reference to the first aspect or the first implementation manner of the first aspect, in an eighth implementation manner of the first aspect, the power consumption parameter is an amount of electricity consumed by the system resource invoked by the application, and the determining a power consumption status of the application based on the power consumption parameter includes: when the amount of electricity consumed by the system resource invoked by the application is greater than or equal to a fifth threshold, determining that the application is in a high power consumption state.

With reference to the eighth implementation manner of the first aspect, in a ninth implementation manner of the first aspect, the obtaining a power consumption parameter of an application includes: determining duration for which the system resource invoked by the application occupies the processing resource and an operating frequency of the processing resource when the processing resource is occupied; determining, according to a preset correspondence between an operating frequency of the processing resource and an amount of electricity consumed by the processing resource per unit time, the amount of electricity consumed per unit time corresponding to the operating frequency of the processing resource; and obtaining, according to the duration for which the system resource invoked by the application occupies the processing resource and the amount of electricity consumed per unit time, the amount of electricity consumed by the system resource invoked by the application.

With reference to the first aspect or the first implementation manner of the first aspect, in a tenth implementation manner of the first aspect, the power consuming resource further includes the processing resource of the user equipment, and the power consumption parameter is a total amount of electricity consumed by all power consuming resources invoked by the application when the application is running.

With reference to the first aspect or any one of the foregoing implementation manners, in an eleventh implementation manner of the first aspect, before the obtaining power consumption parameters corresponding to multiple power consumption characteristics of the application, the method further includes: determining that a current amount of electricity of the user equipment is less than or equal to a sixth threshold; or determining that a decreasing rate of an amount of electricity of the user equipment is greater than or equal to a seventh threshold.

According to a second aspect, a power management apparatus for user equipment is provided, including: an obtaining unit, configured to obtain a power consumption parameter of an application, where the application is installed in the user equipment, the power consumption parameter is used to represent information about an amount of electricity consumed by a power consuming resource invoked by the application when the application is running, the power consuming resource includes a system resource of the user equipment and/or a component resource of the user equipment, the component resource is another hardware resource other than a processing resource in the user equipment, and the system resource includes an operating system resource and/or a platform system resource of the user equipment; a determining unit, configured to determine a power consumption status of the application based on the power consumption parameter obtained by the obtaining unit; and a reporting unit, configured to generate a power consumption report of the application based on the power consumption status of the application determined by the determining unit.

With reference to the second aspect, in a first implementation manner of the second aspect, the power consumption report includes identification information of the application, and the power consumption report further includes one or more pieces of the following information: a power consumption level of the application, an amount of electricity consumed by the application, a percentage of the amount of electricity consumed by the application to a total amount of electricity consumed by the user equipment, or description information of a power consumption reason.

With reference to the second aspect or the first implementation manner of the second aspect, in a second implementation manner of the second aspect, the power consuming resource further includes the processing resource of the user equipment, and the power consumption parameter is a quantity of times that the application regularly wakes up the user equipment, and the determining unit is specifically configured to: when the quantity of times is greater than or equal to a first threshold, determine that the application is in a high power consumption state.

With reference to the second aspect or the first implementation manner of the second aspect, in a third implementation manner of the second aspect, the power consuming resource further includes the processing resource of the user equipment, and the power consumption parameter is duration for which the application locks the user equipment to be in a waking state, and the determining unit is specifically configured to: when the duration is greater than or equal to a second threshold, determine that the application is in a high power consumption state.

With reference to the second aspect or the first implementation manner of the second aspect, in a fourth implementation manner of the second aspect, the power consuming resource further includes the processing resource of the user equipment, and the power consumption parameter is a quantity of times that the application automatically starts, and the determining unit is specifically configured to: when the quantity of times is greater than or equal to a third threshold, determine that the application is in a high power consumption state.

With reference to the second aspect or the first implementation manner of the second aspect, in a fifth implementation manner of the second aspect, the power consumption parameter is an amount of electricity consumed by a component invoked by the application, and the determining unit is specifically configured to: when the amount of electricity consumed by the component is greater than or equal to a fourth threshold, determine that the application is in a high power consumption state.

With reference to the fifth implementation manner of the second aspect, in a sixth implementation manner of the second aspect, the obtaining unit is specifically configured to: determine duration for which the component is invoked by the application, and obtain, according to the duration for which the component is invoked by the application and a preset amount of electricity consumed by the component per unit time, the amount of electricity consumed by the component.

With reference to the fifth or the sixth implementation manner of the second aspect, in a seventh implementation manner of the second aspect, the component includes a Global Positioning System module, a mobile communications module, a wireless local area network communications module, or a backlight module.

With reference to the second aspect or the first implementation manner of the second aspect, in an eighth implementation manner of the second aspect, the power consumption parameter is an amount of electricity consumed by the system resource invoked by the application, and the determining unit is specifically configured to: when the amount of electricity consumed by the system resource invoked by the application is greater than or equal to a fifth threshold, determine that the application is in a high power consumption state.

With reference to the eighth implementation manner of the second aspect, in a ninth implementation manner of the second aspect, the obtaining unit is specifically configured to: determine duration for which the system resource invoked by the application occupies the processing resource and an operating frequency of the processing resource when the processing resource is occupied; determine, according to a preset correspondence between an operating frequency of the processing resource and an amount of electricity consumed by the processing resource per unit time, the amount of electricity consumed per unit time corresponding to the operating frequency of the processing resource; and obtain, according to the duration for which the system resource invoked by the application occupies the processing resource and the amount of electricity consumed per unit time, the amount of electricity consumed by the system resource invoked by the application.

With reference to the second aspect or the first implementation manner of the second aspect, in a tenth implementation manner of the second aspect, the power consuming resource further includes the processing resource of the user equipment, and the power consumption parameter is a total amount of electricity consumed by all power consuming resources invoked by the application when the application is running.

With reference to the second aspect or any one of the foregoing implementation manners, in an eleventh implementation manner of the second aspect, the obtaining unit is specifically configured to: when it is determined that a current amount of electricity of the user equipment is less than or equal to a sixth threshold or when it is determined that a decreasing rate of an amount of electricity of the user equipment is greater than or equal to a seventh threshold, obtain the power consumption parameter of the application.

According to a third aspect, user equipment is provided, including the power management apparatus according to any one of the foregoing.

In the embodiments of the present invention, when statistics are collected on a power consumption condition of an application, power consumption caused by invoking a system resource or a component resource is considered. In this way, an obtained power consumption statistics result is more accurate.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

User equipment (UE, User Equipment) may also be referred to as a terminal. The user equipment may be a mobile terminal, such as a mobile phone (also referred to as a "cellular" phone) or a computer with a mobile terminal, for example, a portable, pocket-sized, handheld, computer built-in, or in-vehicle mobile apparatus.

It should be noted that in the embodiments of the present invention, the term "application" includes various forms of applications that need to consume power on the UE, for example, an application program (App or application). In another example, the application may further be an operating system process, a platform system process, or the like. Each application occupies a processing resource when the application is running, for example, a CPU or a graphic processing unit (GPU, Graphic Processing Unit). In addition, the application may occupy another component resource, for example, a Global Positioning System (GPS, Global Positioning System) module, a mobile communications module (for example, a mobile communications chip, a transceiver, and an antenna unit), another communications module (for example, a WiFi module, a Bluetooth module, and an infrared module), an audio module (for example, a speaker and a microphone), a camera module, a sensor module (for example, a gyroscope, an accelerometer, a gravimeter, a pedometer, a fingerprint recognition module, and a touchscreen), a display module (for example, a liquid crystal display and a backlight module), and a lighting module (for example, a flash and a light source module). In addition, the application may occupy a system resource when the application is running. For example, the application may need to invoke some components or some threads of an operating system when the application is running, for example, an application programming interface (API, Application Programming Interface). These resources or systems consume some electricity when invoked by the application. A person skilled in the art may understand that examples of the specific resources or systems described above are merely exemplary, and are not intended to limit the scope of the embodiments of the present invention.

The operating system process herein refers to a process of implementing a basic function of an operating system. The platform system process mainly refers to a process of enhancing a function in a system. The operating system process and the platform system process may be collectively referred to as system processes, which are generally installed in user equipment in advance by a vendor or an operator and generally cannot be deleted by a user at will.

A power management function of the user equipment may collect statistics on an amount of electricity consumed when a CPU and/or a GPU runs the application. For example, a correspondence between a CPU and/or GPU frequency and a power consumption current may be configured in the user equipment. When an application is running, a running time of the application and a CPU and/or GPU frequency in running may be obtained in real time. Then, a corresponding power consumption current is found according to the obtained CPU and/or GPU frequency and the correspondence that is configured above. An amount of electricity consumed by the application may be obtained through estimation by multiplying the found power consumption current by the running time of the application.

However, if statistics are collected on the amount of electricity consumed by the application merely based on a frequency of the processing resource, a statistics result is inaccurate. As described above, the application consumes electricity very likely due to invoking another resource in addition to the processing resource. In the embodiments of the present invention, resources consuming electricity in the user equipment are collectively referred to as "power consuming resources".

Figure 1:
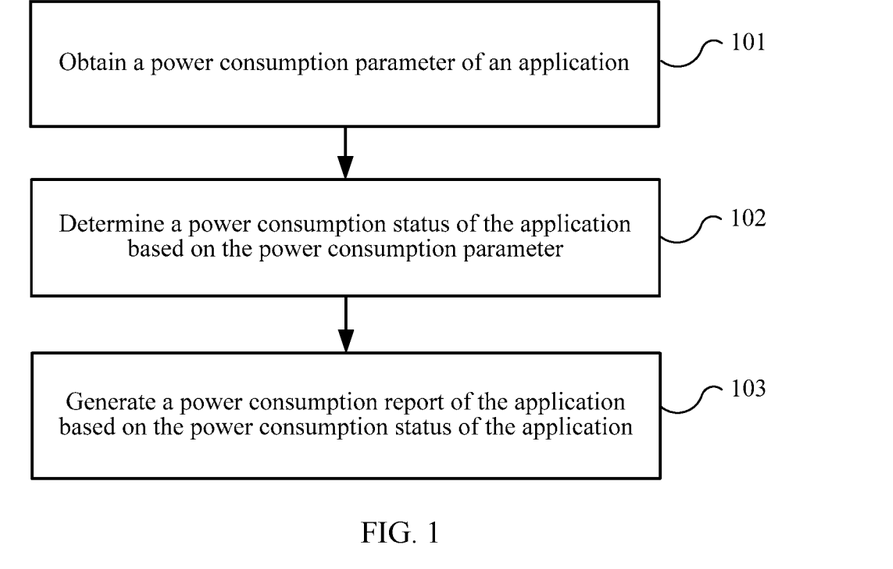
FIG. 1 is a schematic flowchart of a power management method according to an embodiment of the present invention.

FIG. 1 is a schematic flowchart of a power management method according to an embodiment of the present invention. The method in FIG. 1 may be executed by user equipment, for example, may be executed by an operating system of the user equipment, or may be executed by a dedicated process (for example, a software kit installed in advance by a user equipment vendor or an operator), or may be executed by an application installed by a user. Entities for executing the method in FIG. 1 may be collectively referred to as power management apparatuses.

101: Obtain a power consumption parameter of an application.

The application is installed in user equipment. The power consumption parameter is used to represent information about an amount of electricity consumed by a power consuming resource invoked by the application when the application is running. For example, the power consumption parameter may be expressed as a value of the amount of electricity or equivalent information that can reflect the amount of consumed electricity.

The power consuming resource may include a system resource of the user equipment and/or a component resource of the user equipment. In addition, the power consuming resource may further include a processing resource of the user equipment.

The component resource is another hardware resource other than the processing resource in the user equipment, for example, a GPS module, a WiFi module, a backlight module, a lighting module, a speaker module, and a sensor module.

The system resource includes an operating system resource or a platform system resource of the user equipment. The operating system resource may include, for example, a basic functional resource of a system, such as a hardware driver (for example, a backlight component driver and a fingerprint recognition component driver), a timer, and an interrupt. The platform system resource may include an enhanced functional resource of the system, for example, a system server (system server) of an Android system, or may include a system component of an operating system, for example, four components of an Android system: an activity (Activity), a service (Service), a broadcast receiver (Broadcast Receiver), and a content provider (Content Provider), or may include a software kit with an enhanced function, for example, a software development kit (SDK, Software Development Kit), and a location information searching kit.

102: Determine a power consumption status of the application based on the power consumption parameter.

103: Generate a power consumption report of the application based on the power consumption status of the application.

In this embodiment of the present invention, when statistics are collected on a power consumption condition of an application, power consumption caused by invoking a system resource or a component resource is considered. In this way, an obtained power consumption statistics result is more accurate.

As described above, the power consumption parameter may be expressed as a value of an amount of electricity or equivalent information that can reflect the amount of consumed electricity. A specific form of the power consumption parameter is not limited in this embodiment of the present invention, as long as the power consumption parameter can quantitatively reflect the power consumption condition of the application.

In an implementation manner, when obtaining the power consumption parameter, the user equipment may traverse all possible resource types. This manner is relatively easy to implement. Before performing power consumption analysis, the user equipment may not need to learn resources that are invoked by the application.

In another implementation manner, the user equipment may determine, according to an application type, a resource type that may be invoked by the application. For example, a correspondence between an application type and a resource may be pre-stored in the user equipment. In an example, an application of an instant messaging type invokes the processing resource and the system resource, invokes a mobile communications module when receiving and sending data by using a mobile network, and invokes a WLAN module (for example, a WiFi module) when using a wireless local area network (WLAN, Wireless Local Area Network). In another example, an application of a video communication type invokes the processing resource and the system resource, invokes a communications module (for example, the foregoing mobile communications module or the foregoing WLAN module), and further invokes a display module (for example, a display screen or a backlight) and a camera module. In still another example, an application of a navigation type invokes the processing resource and the system resource, invokes a GPS module and a display module, may further invoke an audio module (for example, a speaker), and in addition, may invoke the communications module, to download a real-time map. In this way, the user equipment may determine, according to a type of an application, a specific resource invoked by the application when the application is running. In this way, a calculation amount of power consumption analysis may be reduced.

In yet another example, the user equipment may monitor, in real time or in semi-real time, which resources are invoked by the application. When invoking a resource, the application issues a corresponding invoking command. A power management apparatus for user equipment may monitor and parse the invoking command in real time, so as to learn resources that are invoked by the application. Alternatively, the power management apparatus for user equipment may obtain, from an operating system or another source after the application has run, an invoking command issued by the application in a running process, so as to learn resources that are invoked by the application by parsing the invoking command. Obtaining of the invoking command herein may be actively pushed by the operating system, or may be fed back by the operating system to the power management apparatus based on a request of the power management apparatus, or may not need to involve the operating system. Instead, the power management apparatus directly probes (probe) the invoking command issued by the application to the operating system. In this way, a calculation amount of power consumption analysis may also be reduced.

Optionally, in an embodiment, the power consumption parameter may be an amount of electricity consumed by the component invoked by the application. In this case, in step 102, when the amount of electricity consumed by the component is greater than or equal to a threshold, it may be determined that the application is in a high power consumption state. For example, units of power consumption and a threshold thereof may be mAh (mAh).

A component invoked by the application may be one or more of the foregoing component resources, for example, the GPS module, the mobile communications module, a WLAN communications module or a backlight module.

Optionally, in another embodiment, in step 101, when the power consumption parameter of the application is obtained, duration for which the component is invoked by the application, and a preset amount of electricity consumed by the component per unit time may be determined. Then, the amount of electricity consumed by the component may be obtained according to the duration for which the component is invoked by the application and the amount of electricity consumed per unit time, for example, by multiplying the duration by the amount of electricity consumed per unit time. The preset amount of electricity consumed per unit time may be an actually-measured value, for example, an average value or a weighted average value of measured amounts of electricity consumed by the component per unit time for past N times when the component is invoked, where N is a positive integer. Alternatively, the preset amount of electricity consumed per unit time may be an empirical value.

In a specific example, using the GPS module as an example, a correspondence between a GPS component and the amount of electricity consumed per unit time may be configured in the user equipment, for example, in a form of an eXtensible Markup Language (XML, eXtensible Markup Language) table. When performing power consumption analysis, the power management apparatus searches for an amount of electricity consumed per unit time corresponding to the GPS module, and multiplies the amount of electricity consumed per unit time by total duration for which the application invokes the GPS module, to obtain an amount of electricity consumed by the GPS module. When the amount of consumed electricity is greater than or equal to a threshold (for example, 100 mAh), it is determined that the application is in a high power consumption state.

Optionally, in another embodiment, the power consumption parameter may be an amount of electricity consumed by the system resource invoked by the application. In this case, in step 102, when the amount of electricity consumed by the system resource invoked by the application is greater than or equal to a threshold, it may be determined that the application is in a high power consumption state.

For example, in step 101, when the power consumption parameter of the application is obtained, duration for which the system resource invoked by the application occupies the processing resource (CPU and/or GPU), and an operating frequency of the processing resource when the processing resource is occupied may be determined. Then, the amount of electricity consumed per unit time corresponding to the operating frequency of the processing resource may be determined according to a preset correspondence between an operating frequency of the processing resource and an amount of electricity consumed by the processing resource per unit time. In this way, the amount of electricity consumed by the system resource invoked by the application may be obtained according to the duration for which the system resource invoked by the application occupies the processing resource and the amount of electricity consumed per unit time.

Using that the processing resource is a CPU as an example, a correspondence between a CPU frequency and the amount of electricity consumed per unit time may be configured in the user equipment, for example, in a form of an XML table. When power consumption analysis is performed, duration for which the system resource (for example, a main thread or a system component) invoked by the application occupies the CPU, and the CPU frequency in an occupation process may be obtained. Then, the XML table may be searched according to the CPU frequency, so as to obtain a corresponding amount of electricity consumed by the CPU per unit time. By multiplying the amount of electricity consumed by the CPU per unit time by duration for which the CPU is occupied, the amount of electricity consumed by the system resource may be obtained.

Another expression manner in addition to an electricity amount value may be used for the power consumption parameter. For example, this expression manner may be used to indicate combination information of an amount of electricity consumed by one or more power consuming resources.

Optionally, in another embodiment, the power consumption parameter may be a quantity of times that the application regularly wakes up the user equipment. In this case, in step 102, when a quantity of times that an application regularly wakes up the user equipment is greater than or equal to a threshold (for example, 1000), it is determined that the application is in a high power consumption state.

For example, to keep an online state or keep a status of connecting to a network server, some applications set a timer, to regularly wake up the user equipment. For example, in a common heartbeat mechanism, an application sends a heartbeat packet to a network side at regular time intervals. When regularly waking up the user equipment, the application invokes the CPU and a corresponding system resource to perform calculation processing. In addition, if the heartbeat packet needs to be sent, the application may further invoke the communications module (for example, the foregoing mobile communications module or the foregoing WLAN module). Each time the user equipment is woken up, an amount of electricity is consumed by invoking these resources. For example, in an unrestricted value example, 1000 times of wakeup operations may consume an amount of electricity of 750 mAh. Therefore, a quantity of times of waking up the user equipment may be used as information representing the amount of electricity consumed by a power consuming resource invoked by the application when the application is running, that is, may be used as the foregoing power consumption parameter.

A starting time point of collecting statistics on the quantity of wakeup times is not limited in this embodiment of the present invention herein. For example, statistics may be collected on the quantity of times of regularly waking up the user equipment by an application starting from a moment at which the user equipment is turned on, statistics may be collected on the quantity of times of regularly waking up the user equipment by the application starting from a moment at which the user equipment is sufficiently charged (for example, more than 90% or 99% of a total amount of electricity) at one time, statistics may be collected on the quantity of times of regularly waking up the user equipment by the application starting from a moment at which power consumption analysis is triggered and started, or statistics may be collected on the quantity of times of regularly waking up the user equipment by the application in a period of time (for example, from 9 a.m. to 9 p.m.). Then, it is determined, according to the quantity of wakeup times on which statistics are collected, whether the application is in a high power consumption state.

Optionally, in another embodiment, the power consumption parameter may be duration for which the application locks the user equipment to be in a waking state. In this case, in step 102, when the duration for which an application locks the user equipment to be in a waking state is greater than or equal to a threshold (for example, one hour), it is determined that the application is in a high power consumption state.

For example, some applications may start a wakelock (wakelock), to prevent the user equipment from entering a standby state. For example, a video playback application or an audio playback application may maintain the wakelock, to prevent the user equipment from sleeping that causes a poor user experience. Alternatively, for example, some applications may maintain the wakelock, to keep an online state. The user equipment cannot enter a standby state, and consequently, the user equipment cannot stop the application from invoking various power consuming resources, thereby consuming a larger amount of electricity. For example, in an unrestricted value example, an amount of electricity of 40 mAh may be consumed when waking is kept for one hour. Therefore, duration for which the user equipment keeps waking may be used as information representing the amount of electricity consumed by a power consuming resource invoked by the application when the application is running, that is, may be used as the foregoing power consumption parameter.

Optionally, in another embodiment, the power consumption parameter may be a quantity of times that the application automatically starts. In this case, in step 102, when the quantity of times is greater than or equal to a threshold (for example, 200 times), it is determined that the application is in a high power consumption state.

For example, to keep an online state or keep a status of connecting to a network server, an application inspects a starting status of the application. When finding that the application is closed, the application may perform an automatic starting operation in the background. Each time the application automatically starts, the application invokes a corresponding power consuming resource, thereby consuming an amount of electricity. For example, in an unrestricted value example, 200 times of automatic starting operations may consume an amount of electricity of 230 mAh. Therefore, a quantity of automatic starting times of the application may be used as information representing the amount of electricity consumed by a power consuming resource invoked by the application when the application is running, that is, may be used as the foregoing power consumption parameter.

A starting time point of collecting statistics on the quantity of automatic starting times is not limited in this embodiment of the present invention herein. For example, statistics may be collected on the quantity of automatic starting times of an application starting from a moment at which the user equipment is turned on, statistics may be collected on the quantity of automatic starting times of the application starting from a moment at which the user equipment is sufficiently charged (for example, more than 90% or 99% of a total amount of electricity) at one time, statistics may be collected on the quantity of automatic starting times of the application starting from a moment at which power consumption analysis is triggered and started, or statistics may be collected on the quantity of automatic starting times of the application in a period of time (for example, from 9 a.m. to 9 p.m.). Then, it is determined, according to the quantity of automatic starting times on which statistics are collected, whether the application is in a high power consumption state.

The method in FIG. 1 may be triggered based on a changing situation of an amount of electricity of the user equipment. Optionally, in an embodiment, when it is determined that a current amount of electricity of the user equipment is less than a threshold, or when a decreasing rate of an amount of electricity of the user equipment is greater than a threshold, processes of the foregoing steps 101 to 103 may be triggered to be executed. For example, in a screen-off state, when the amount of electricity consumed by the user equipment in an hour reaches 3% or 5% of the total amount of electricity, the processes of the foregoing steps 101 to 103 are triggered to be executed; or in a screen-on state, when the amount of electricity consumed by the user equipment in an hour reaches 10% of the total amount of electricity, the processes of the foregoing steps 101 to 103 are triggered to be executed.

In addition, specific content of the power consumption report is not limited in this embodiment of the present invention. In an embodiment, the power consumption report may include identification information of the application, for example, an application name. In addition, the power consumption report may further include other information, for example, a power consumption level (for example, high power consumption, middle power consumption, and low power consumption) of the application, an amount of electricity consumed by the application, a percentage of the amount of electricity consumed by the application to a total amount of electricity consumed by the user equipment, or description information of a power consumption characteristic.

This embodiment of the present invention is described below in more details with reference to specific examples.

Figure 2:
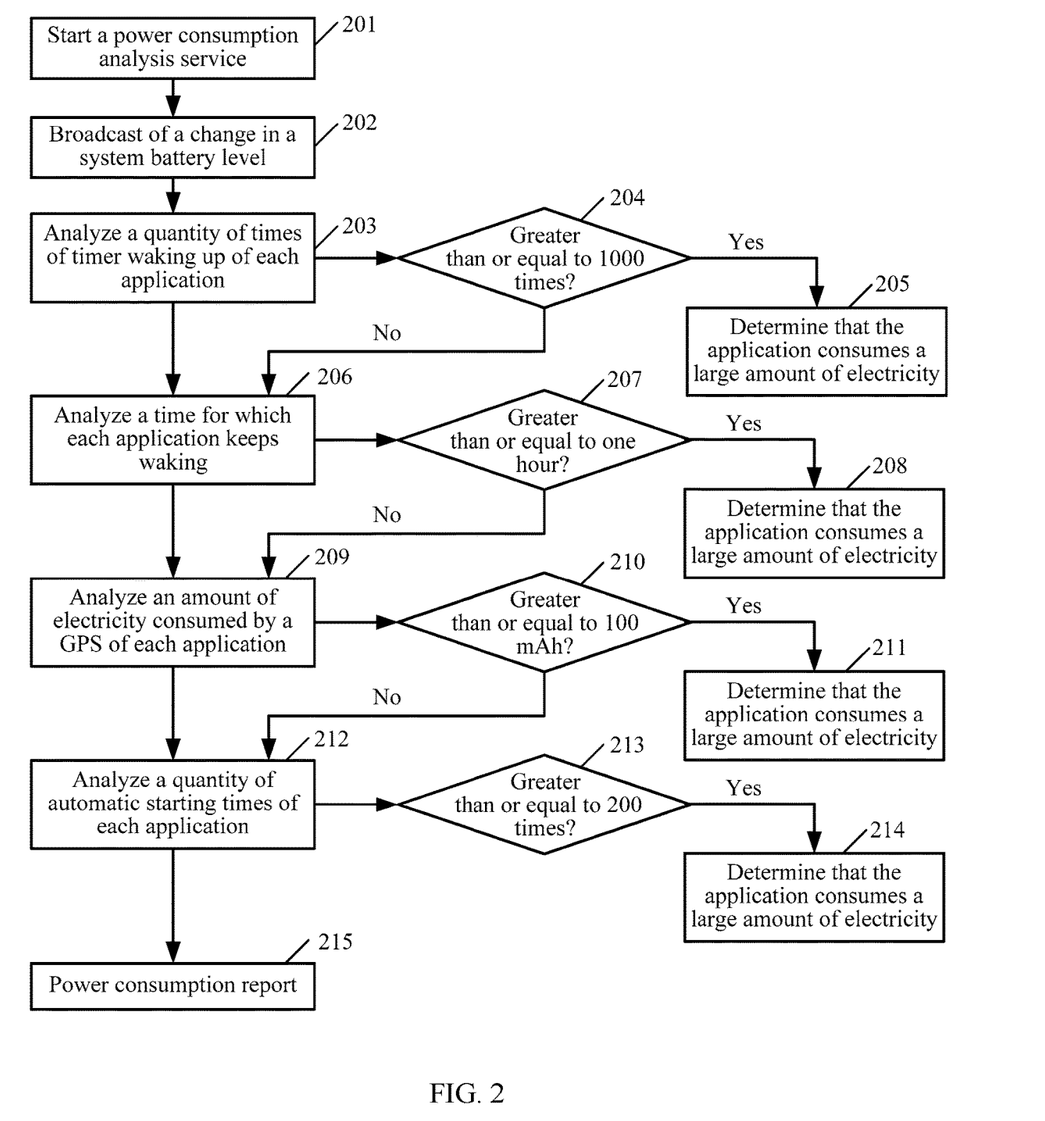
FIG. 2 is a schematic flowchart of a power management process according to an embodiment of the present invention.

FIG. 2 is a schematic flowchart of a power management process according to an embodiment of the present invention.

In the embodiment of FIG. 2, a power management apparatus traverses several types of power consumption parameters, to determine whether an application is in a high power consumption state. It should be noted that a specific value given in the embodiment of FIG. 2 is merely exemplary, and is not intended to limit the scope of this embodiment of the present invention.

In addition, in the following specific embodiments, descriptions are given by using an Android operating system as an example. However, an applicable operating system is not limited in this embodiment of the present invention, and this embodiment of the present invention may also be used in another operating system.

201: Start a power consumption analysis service.

For example, if the power management apparatus is an application installed by a user, the user may start the power consumption analysis service by opening the application. In another embodiment, the power consumption analysis service may automatically start (for example, may start when user equipment is turned on), or may run as a daemon.

202: Receive a broadcast of a change in a system battery level.

For example, when an amount of electricity of the user equipment changes, a system sends, to the outside, a broadcast whose intent action (Intent Action) is Android.intent.action.BATTERY_CHANGED. When this constant broadcast represents that the amount of electricity of the user equipment abnormally decreases (for example, a decreasing rate of the amount of electricity is greater than a preset threshold), a subsequent process of obtaining a power consumption parameter of each application and analyzing a power consumption status of each application is executed. In other words, subsequent steps 203 to 214 may be performed on each application in a set of to-be-analyzed applications. The set of the to-be-analyzed applications may be preset, may be selected by a user, or may be updated according to a historical power consumption analysis result.

203 to 205 are an analysis branch.

203: Obtain quantities of times of timer waking up of multiple to-be-analyzed applications.

204: Determine whether a quantity of times of waking up each application is greater than or equal to a preset threshold, for example, 1000 times, where if the quantity of wakeup times is less than 1000 times, another analysis branch continues to be performed on the application, that is, to perform step 206, 209, or 212.

205: If a quantity of times of waking up an application is greater than or equal to 1000 times, determine that the application is in a high power consumption state. The application is recorded in a power consumption report. For example, identification information (for example, a name) of the application and a power consumption status (for example, "high power consumption") are recorded, and a reason of high power consumption may be recorded as "an excessively large quantity of times of timer wakeup".

206 to 208 are another analysis branch.

206: Obtain duration for which user equipment keeps waking and that is caused by the multiple to-be-analyzed applications because of wakelock.

207: Determine whether duration corresponding to each application is greater than or equal to a preset threshold, for example, one hour, where if the corresponding duration is less than one hour, another analysis branch that is not executed yet continues to be performed on the application.

208: If duration for which the user equipment keeps waking and that is caused by an application is greater than or equal to one hour, determine that the application is in a high power consumption state. The application is recorded in the power consumption report. For example, identification information (for example, a name) of the application and a power consumption status (for example, "high power consumption") are recorded, and a reason of high power consumption may be recorded as "an excessively long time of keeping waking".

209 to 211 are another analysis branch.

209: Obtain amounts of consumed electricity caused when the multiple to-be-analyzed applications invoke a GPS module.

210: Determine whether an amount of electricity consumed by the GPS corresponding to each application is greater than or equal to a preset threshold, for example, 100 mAh, where if the amount of electricity consumed by the GPS is less than 100 mAh, another analysis branch that is not executed yet continues to be performed on the application.

211: If the amount of electricity consumed by the GPS corresponding to an application is greater than or equal to 100 mAh, determine that the application is in a high power consumption state. The application is recorded in the power consumption report. For example, identification information (for example, a name) of the application and a power consumption status (for example, "high power consumption") are recorded, and a reason of high power consumption may be recorded as "excessive electricity consumed by the GPS".

212 to 214 are another analysis branch.

212: Obtain quantities of automatic starting times of the multiple to-be-analyzed applications.

213: Determine whether a quantity of automatic starting times of each application is greater than or equal to a preset threshold, for example, 200 times, where if the quantity of automatic starting times is less than 200 times, another analysis branch that is not executed yet continues to be performed on the application.

214: If a quantity of automatic starting times of an application is greater than or equal to 200 times, determine that the application is in a high power consumption state. The application is recorded in the power consumption report. For example, identification information (for example, a name) of the application and a power consumption status (for example, "high power consumption") are recorded, and a reason of high power consumption may be recorded as "the excessively large quantity of automatic starting times".

215: When all analysis branches have been performed, present the generated power consumption report to a user.

For example, all or some of results of the power consumption report may be presented to the user on an application interface of the power management apparatus, or the user may be reminded, in a manner of a popup window, of applications that are in a high power consumption state. A specific form of representing the power consumption report is not limited in this embodiment of the present invention. In addition, there may be an additional function in the application interface of the power management apparatus, for example, allowing the user to directly close or delete a high power consumption application on an interface of the power consumption report, or close a high power consumption function (for example, a GPS function) of the application. In addition, operations such as power consumption ranking may be performed.

In this embodiment of the present invention, when statistics are collected on a power consumption condition of an application, not only power consumption caused by invoking a processing resource is considered, but also power consumption caused by invoking a system resource or a component resource is considered. In this way, an obtained power consumption statistics result is more accurate.

A sequence of performing the foregoing analysis branches is not limited to what is shown in FIG. 2. For example, sequences may be switched or the analysis branches may be performed in parallel. In addition, a quantity and a specific analysis object that are of the analysis branches are not limited to what is shown in FIG. 2. There may be more or less analysis branches, and for the analysis branches, another power consumption reason may also be analyzed, for example, invoking of a WiFi module, operating duration of a backlight, a quantity of flashing times of a flash, and operating duration of a speaker.

Figure 3:
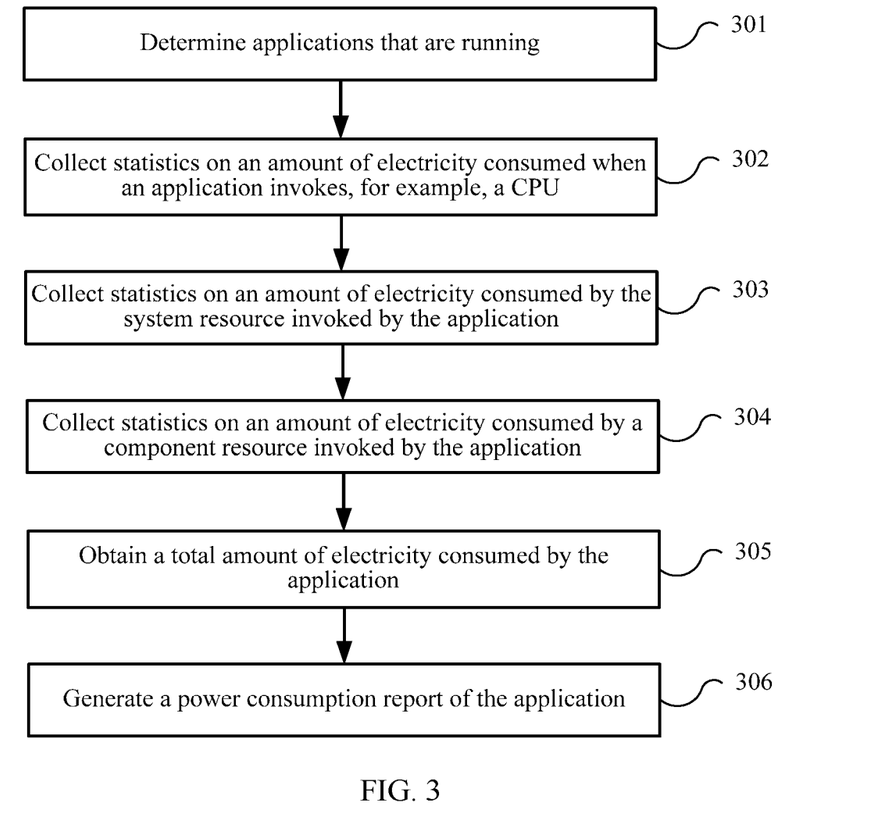
FIG. 3 is a schematic flowchart of a power management process according to another embodiment of the present invention.

FIG. 3 is a schematic flowchart of a power management process according to another embodiment of the present invention.

In the embodiment of FIG. 3, for a specific application, a power consumption status of the application is analyzed and a power consumption report of the application is generated.

301: Determine which applications are running.

Subsequent steps are performed on one or more applications that are running.

302: Collect statistics on an amount of electricity consumed when an application invokes a processing resource (using a CPU as an example).

For example, duration for which the application occupies the CPU, and an operating frequency of the CPU during occupation may be determined. A table of a preset correspondence between an operating frequency and an amount of electricity consumed per unit time is searched, to obtain the amount of electricity consumed per unit time at the operating frequency. By multiplying the amount of electricity consumed per unit time by the occupation duration, the amount of electricity consumed by the CPU invoked by the application may be obtained.

303: Collect statistics on an amount of electricity consumed by a system resource invoked by the application.

For example, when the application invokes the system resource, the system resource also occupies the CPU and consumes an amount of electricity. If statistics are not collected on the amount of electricity consumed by the system resource invoked by the application, but statistics are collected merely on a total amount of electricity consumed by invoking the system resource of user equipment, a user can merely learn an amount of electricity that is consumed because the system resource is invoked, but cannot learn applications that cause power consumption. In this embodiment of the present invention, statistics on both the amount of electricity in step 302 and the amount of electricity in step 303 may be collected and used as the amount of electricity consumed by the application, to obtain a more accurate statistics result.

304: Collect statistics on an amount of electricity consumed by a component resource invoked by the application.

For example, it is assumed that the application invokes a WiFi module to perform communication. An amount of electricity consumed per unit time corresponding to the WiFi module is searched for, and the amount of electricity consumed per unit time is multiplied by total duration for which the application invokes the WiFi module, to obtain a total amount of electricity consumed by the WiFi module.

For another example, it is assumed that the application needs a display module to display content, and therefore, the application needs to invoke a backlight module. An amount of electricity consumed by the backlight module per unit time corresponding to a brightness level of a display screen when the application is running is searched for, and the amount of electricity consumed per unit time is multiplied by total duration for which the application invokes the backlight module, to obtain an amount of electricity consumed by the backlight module.

305: Obtain, based on amounts that are of electricity consumed by various resources and that are obtained in steps 302 to 304, a total amount of electricity consumed by the application.

For the total amount of consumed electricity, not only statistics are collected on the amount of electricity consumed by the processing resource, but also statistics are collected on the amount of electricity consumed by the system resource and the component resource. Therefore, a power consumption status of the application is more accurately reflected.

306: Generate a power consumption report of the application.

The power consumption report may include identification information of the application, and in addition, may further include the total amount of consumed electricity obtained in step 305. In addition, a power consumption level of the application may be further determined according to the total amount of consumed electricity. For example, power consumption ranges corresponding to different power consumption levels (for example, high power consumption, middle power consumption, and low power consumption) may be preset.

In addition, the amount of consumed electricity may be represented as a specific electricity amount value, whose unit is, for example, mAh, or may be represented as a proportional value of a total amount of electricity of the user equipment.

In this embodiment of the present invention, when statistics are collected on a power consumption condition of an application, not only power consumption caused by invoking a processing resource is considered, but also power consumption caused by invoking a system resource or a component resource is considered. In this way, an obtained power consumption statistics result is more accurate.

Figure 4:
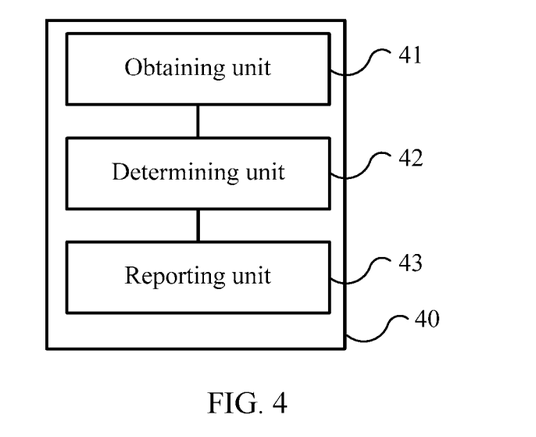
FIG. 4 is a block diagram of a power management apparatus according to an embodiment of the present invention.

FIG. 4 is a block diagram of a power management apparatus according to an embodiment of the present invention. As shown in FIG. 4, the power management apparatus 40 includes: an obtaining unit 41, a determining unit 42, and a reporting unit 43.

The obtaining unit 41 is configured to obtain a power consumption parameter of an application. The application is installed in user equipment. The power consumption parameter is used to represent information about an amount of electricity consumed by a power consuming resource invoked by the application when the application is running. The power consuming resource includes a system resource of the user equipment and/or a component resource of the user equipment. The component resource is another hardware resource other than a processing resource in the user equipment, and the system resource includes an operating system resource and/or a platform system resource of the user equipment. In addition, the power consuming resource may further include the processing resource of the user equipment.

The determining unit 42 is configured to determine a power consumption status of the application based on the power consumption parameter obtained by the obtaining unit 41.

The reporting unit 43 is configured to generate a power consumption report of the application based on the power consumption status of the application determined by the determining unit 42.

In this embodiment of the present invention, when statistics are collected on a power consumption condition of an application, power consumption caused by invoking a system resource or a component resource is considered. In this way, an obtained power consumption statistics result is more accurate.

The power management apparatus in FIG. 4 may implement the processes in the embodiments of FIG. 1 to FIG. 3. Details are not described again to avoid repetition.

Optionally, in an embodiment, the power consumption report may include identification information of the application. The power consumption report may further include one or more pieces of the following information: a power consumption level of the application, an amount of electricity consumed by the application, a percentage of the amount of electricity consumed by the application to a total amount of electricity consumed by the user equipment, or description information of a power consumption reason.

Optionally, in another embodiment, the power consumption parameter may be a quantity of times that the application regularly wakes up the user equipment. When the quantity of times is greater than or equal to a first threshold, the determining unit 42 may determine that the application is in a high power consumption state.

Optionally, in another embodiment, the power consumption parameter may be duration for which the application locks the user equipment to be in a waking state. When the duration is greater than or equal to a second threshold, the determining unit 42 may determine that the application is in a high power consumption state.

Optionally, in another embodiment, the power consumption parameter may be a quantity of times that the application automatically starts. When the quantity of times is greater than or equal to a third threshold, the determining unit 42 may determine that the application is in a high power consumption state.

Optionally, in another embodiment, the power consumption parameter may be an amount of electricity consumed by a component invoked by the application. When the amount of electricity consumed by the component is greater than or equal to a fourth threshold, the determining unit 42 may determine that the application is in a high power consumption state.

Optionally, in another embodiment, the obtaining unit 41 may determine duration for which the component is invoked by the application, and a preset amount of electricity consumed by the component per unit time; and obtain, according to the duration for which the component is invoked by the application and the amount of electricity consumed per unit time, the amount of electricity consumed by the component.

Optionally, in another embodiment, the foregoing component may include a GPS module, a mobile communications module, a wireless local area network communications module, a backlight module, or the like.

Optionally, in another embodiment, the power consumption parameter may be an amount of electricity consumed by the system resource invoked by the application. When the amount of electricity consumed by the system resource invoked by the application is greater than or equal to a fifth threshold, the determining unit 42 may determine that the application is in a high power consumption state.

Optionally, in another embodiment, the obtaining unit 41 may determine duration for which the system resource invoked by the application occupies the processing resource and an operating frequency of the processing resource when the processing resource is occupied; determine, according to a preset correspondence between an operating frequency of the processing resource and an amount of electricity consumed by the processing resource per unit time, the amount of electricity consumed per unit time corresponding to the operating frequency of the processing resource; and obtain, according to the duration for which the system resource invoked by the application occupies the processing resource and the amount of electricity consumed per unit time, the amount of electricity consumed by the system resource invoked by the application.

Optionally, in another embodiment, the power consumption parameter may be a total amount of electricity consumed by a power consuming resource invoked by the application when the application is running, for example, what is shown according to the embodiment of FIG. 3.

Optionally, in another embodiment, the obtaining unit 41 may obtain the power consumption parameter of the application when it is determined that a current amount of electricity of the user equipment is less than or equal to a sixth threshold or when it is determined that a decreasing rate of an amount of electricity of the user equipment is greater than or equal to a seventh threshold.

The user equipment in this embodiment of the present invention may include the foregoing power management apparatus 40.

Figure 5:
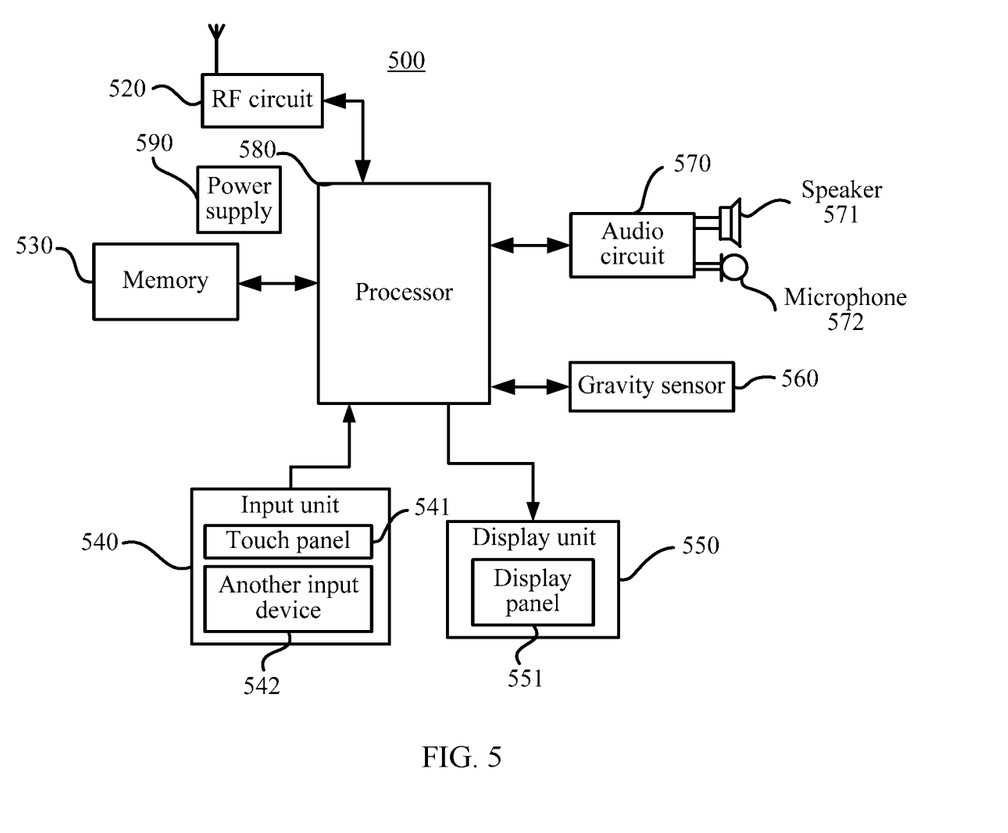
FIG. 5 is a schematic block diagram of user equipment according to an embodiment of the present invention.

FIG. 5 is a schematic block diagram of user equipment according to an embodiment of the present invention.

The user equipment (for example, a mobile phone) provided in this embodiment of the present invention may be configured to implement the methods implemented by the embodiments of the present invention shown in FIG. 1 to FIG. 3. For convenience of description, merely a part related to this embodiment of the present invention is shown. For a specific technical detail that is not disclosed, refer to the embodiments of the present invention shown in FIG. 1 to FIG. 3.

The mobile terminal may be terminal devices such as a mobile phone, a tablet computer, a notebook computer, a UMPC (Ultra-mobile Personal Computer, ultra-mobile personal computer), a netbook, a PDA (Personal Digital Assistant, personal digital assistant), and the like. In this embodiment of the present invention, description is given by using an example in which the mobile terminal is a mobile phone. FIG. 5 is a block diagram of a partial structure of a mobile phone 500 related to the embodiments of the present invention.

As shown in FIG. 5, the mobile phone 500 includes components such as an RF (radio frequency, radio frequency) circuit 520, a memory 530, an input unit 540, a display unit 550, a gravity sensor 560, an audio circuit 570, a processor 580, and a power supply 590. A person skilled in the art may understand that the structure of the mobile phone shown in FIG. 5 does not constitute a limitation on the mobile phone, and the mobile phone may include more components or fewer components than those shown in the figure, or some components may be combined, or a different component deployment may be used.

The components of the mobile phone 500 are specifically described below with reference to FIG. 5.

The RF circuit 520 may be configured to receive and send signals in a process of receiving and sending information or in a call process. Particularly, after receiving downlink information of a base station, the RF circuit 510 delivers the downlink information to the processor 580 for processing, and sends uplink data to the base station. Usually, the RF circuit includes but is not limited to an antenna, at least one amplifier, a transceiver, a coupler, an LNA (low noise amplifier, low noise amplifier), a duplexer, and the like. In addition, the RF circuit 520 may also communicate with a network and another device by means of wireless communication. The wireless communication may use any communication standard or protocol, including but not limited to GSM (global system of mobile communication, Global System for Mobile Communications), GPRS (general packet radio service, General Packet Radio Service), CDMA (code division multiple access, Code Division Multiple Access), WCDMA (wideband code division multiple access, Wideband Code Division Multiple Access), LTE (long term evolution, Long Term Evolution), Email, SMS (short messaging service, short messaging service), and the like.

The memory 530 may be configured to store a software program and a module. The processor 580 runs the software program and the module that are stored in the memory 530, to implement various functional applications and data processing of the mobile phone 500. The memory 530 may mainly include a program storage area and a data storage area. The program storage area may store an operating system, an application program required by at least one function (such as a sound playback function and an image display function), and the like. The data storage area may store data (such as audio data, image data, and an address book) created according to use of the mobile phone 500, and the like. In addition, the memory 530 may include a high-speed random access memory, and may also include a non-volatile memory such as at least one disk storage device, a flash memory device, or another volatile solid-state storage device.

The input unit 540 may be configured to receive input digit or character information, and generate a key signal input related to a user setting and function control of the mobile phone 500. Specifically, the input unit 540 may include a touchscreen 541 and another input device 542. The touchscreen 541, also referred to as a touch control panel, can collect touch operations (for example, an operation on the touchscreen 541 or around the touchscreen 541 from a user by using any proper object or accessory such as a finger or a touchpen) on or around the touchscreen 541, and drive a corresponding connecting apparatus according to a preset program. Optionally, the touchscreen 541 may include two parts: a touch detection apparatus and a touch controller. The touch detection apparatus detects a touch direction of the user, detects a signal generated by the touch operation, and transfers the signal to the touch controller. The touch controller receives touch information from the touch detection apparatus, converts the touch information into touch point coordinates, and then sends the touch point coordinates to the processor 580. Moreover, the touch controller can receive and execute a command sent from the processor 580. In addition, the touchscreen 541 may be implemented in various types such as resistance-type, capacitance-type, infrared, and surface acoustic wave. In addition to the touchscreen 541, the input unit 540 may further include another input device 542. Specifically, the another input device 542 may include, but is not limited to, one or more of a physical keyboard, a functional key (such as a volume control key or a power supply switch key), a trackball, a mouse, and a joystick.

The display unit 550 may be configured to display information input by the user or information provided for the user, and various menus of the mobile phone 500. The display unit 550 may include a display panel 551. Optionally, the display panel 541 may be configured in a form of an LCD (Liquid Crystal Display, liquid crystal display), an OLED (Organic Light-Emitting Diode, organic light-emitting diode), or the like. Further, the touchscreen 541 may cover the display panel 551. When detecting the touch operations on or around the touchscreen 541, the touchscreen 541 transfers the touch operations to the processor 580, to determine a type of a touch event, and then the processor 580 provides a corresponding visual output on the display panel 551 according to the type of the touch event. In FIG. 5, the touchscreen 541 and the display panel 551 are used as two independent components to implement an input function and an input function of the mobile phone 500, but in some embodiments, the touchscreen 541 may be integrated with the display panel 551 to implement the input function and the output function of the mobile phone 500.

The gravity sensor (gravity sensor) 560 may detect magnitude of accelerations of a mobile phone in various directions (which are generally triaxial), may detect magnitude and a direction of gravity when the mobile phone is static, and may be used for an application that identifies a mobile phone gesture (for example, switching between a horizontal screen and a vertical screen, a related game, and magnetometer gesture calibration), a function related to vibration identification (for example, a pedometer and a knock), and the like.

The mobile phone 500 may further include another sensor, for example, an optical sensor. Specifically, the optical sensor may include an ambient light sensor and an optical proximity sensor. The ambient light sensor may adjust brightness of the display panel 541 according to brightness of ambient light. The optical proximity sensor may detect whether there is an object approaching or touching the mobile phone, and may turn off the display panel 541 and/or a backlight when the mobile phone 500 is moved to an ear. Another sensor, such as a gyroscope, a barometer, a hygrometer, a thermometer, or an infrared sensor that may be configured in the mobile phone 500 is not described herein.

The audio circuit 570, a speaker 571, and a microphone 572 may provide an audio interface between a user and the mobile phone 500. The audio circuit 570 may convert received audio data into an electrical signal and transmit the electrical signal to the speaker 571. The speaker 571 converts the electrical signal into a sound signal for output. On the other hand, the microphone 572 converts a collected sound signal into an electrical signal. The audio circuit 570 receives the electrical signal, converts the electrical signal into audio data, and then outputs the audio data to the RF circuit 520, so as to send the audio data to, for example, another mobile phone, or outputs the audio data to the memory 530 for further processing.

The processor 580 is a control center of the mobile phone 500, and is connected to various parts of the whole mobile phone by using various interfaces and lines. By running or executing the software program and/or the module stored in the memory 530, and invoking the data stored in the memory 530, the processor 580 performs various functions and data processing of the mobile phone 500, thereby performing overall monitoring on the mobile phone. Optionally, the processor 580 may include one or more processing units. Preferably, the processor 580 may be integrated with an application processor and a modem processor. The application processor mainly processes an operating system, a user interface, an application program, and the like. The modem processor mainly processes wireless communication. It may be understood that the foregoing modem processor may be not integrated into the processor 580.

The mobile phone 500 further includes the power supply 590 (such as a battery) for supplying power to the components. Preferably, the power supply may be logically connected to the processor 580 by using a power management system, thereby implementing functions such as charging management, discharging management and power consumption management by using the power management system.

Although not shown, the mobile phone 500 may further include a WiFi (wireless fidelity, wireless fidelity) module, a Bluetooth module, and the like. Details are not described herein.

In this embodiment of the present invention, the processor 580 is further configured to obtain a power consumption parameter of an application. The application is installed in user equipment. The power consumption parameter is used to represent information about an amount of electricity consumed by a power consuming resource invoked by the application when the application is running. The power consuming resource includes a system resource of the user equipment and/or a component resource of the user equipment. The component resource is another hardware resource other than a processing resource in the user equipment, and the system resource includes an operating system resource and/or a platform system resource of the user equipment. In addition, the power consuming resource may further include the processing resource of the user equipment.

The processor 580 is further configured to determine a power consumption status of the application based on the power consumption parameter.

The processor 580 is further configured to generate a power consumption report of the application based on the power consumption status of the application.

In this embodiment of the present invention, when statistics are collected on a power consumption condition of an application, not only power consumption caused by invoking a processing resource is considered, but also power consumption caused by invoking a system resource or a component resource is considered. In this way, an obtained power consumption statistics result is more accurate.

The user equipment in FIG. 5 may implement the processes in the embodiments of FIG. 1 to FIG. 3. Details are not described again to avoid repetition.

Optionally, in an embodiment, the power consumption report may include identification information of the application. The power consumption report may further include one or more pieces of the following information: a power consumption level of the application, an amount of electricity consumed by the application, a percentage of the amount of electricity consumed by the application to a total amount of electricity consumed by the user equipment, or description information of a power consumption reason.

Optionally, in another embodiment, the power consumption parameter may be a quantity of times that the application regularly wakes up the user equipment. When the quantity of times is greater than or equal to a first threshold, the processor 580 may determine that the application is in a high power consumption state.

Optionally, in another embodiment, the power consumption parameter may be duration for which the application locks the user equipment to be in a waking state. When the duration is greater than or equal to a second threshold, the processor 580 may determine that the application is in a high power consumption state.

Optionally, in another embodiment, the power consumption parameter may be a quantity of times that the application automatically starts. When the quantity of times is greater than or equal to a third threshold, the processor 580 may determine that the application is in a high power consumption state.

Optionally, in another embodiment, the power consumption parameter may be an amount of electricity consumed by a component invoked by the application. When the amount of electricity consumed by the component is greater than or equal to a fourth threshold, the processor 580 may determine that the application is in a high power consumption state.

Optionally, in another embodiment, the processor 580 may determine duration for which the component is invoked by the application, and a preset amount of electricity consumed by the component per unit time; and obtain, according to the duration for which the component is invoked by the application and the amount of electricity consumed per unit time, the amount of electricity consumed by the component.

Optionally, in another embodiment, the power consumption parameter may be an amount of electricity consumed by the system resource invoked by the application. When the amount of electricity consumed by the system resource invoked by the application is greater than or equal to a fifth threshold, the processor 580 may determine that the application is in a high power consumption state.

Optionally, in another embodiment, the processor 580 may determine duration for which the system resource invoked by the application occupies the processing resource and an operating frequency of the processing resource when the processing resource is occupied; determine, according to a preset correspondence between an operating frequency of the processing resource and an amount of electricity consumed by the processing resource per unit time, the amount of electricity consumed per unit time corresponding to the operating frequency of the processing resource; and obtain, according to the duration for which the system resource invoked by the application occupies the processing resource and the amount of electricity consumed per unit time, the amount of electricity consumed by the system resource invoked by the application.

Optionally, in another embodiment, the power consumption parameter may be a total amount of electricity consumed by a power consuming resource invoked by the application when the application is running, for example, what is shown according to the embodiment of FIG. 3.

Optionally, in another embodiment, the processor 580 may obtain the power consumption parameter of the application when it is determined that a current amount of electricity of the user equipment is less than or equal to a sixth threshold or when it is determined that a decreasing rate of an amount of electricity of the user equipment is greater than or equal to a seventh threshold.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power management method for a terminal, comprising:
   determining, by the terminal, that a current amount of electricity of the terminal is less than or equal to a first threshold, or that a decreasing rate of an amount of electricity of the terminal is greater than or equal to a second threshold;
   obtaining, when the current amount of electricity of the terminal is less than or equal to the first threshold or when the decreasing rate of the amount of electricity of the terminal is greater than or equal to the second threshold, a power consumption parameter of an application, wherein the application is installed in the terminal, the power consumption parameter is used to represent information about an amount of electricity consumed by a power consuming resource invoked by the application when the application is in an active execution state within the terminal and when the application is in a background state of the terminal, the power consuming resource comprises at least one of a system resource of the terminal, a component resource of the terminal, and a processing resource of the terminal, the component resource is a hardware resource other than the processing resource of the terminal, and the system resource comprises at least one of an operating system resource of the terminal or a platform system resource of the terminal;
   determining, by the terminal, a power consumption status of the application based on the power consumption parameter;
   generating, by the terminal, a power consumption report of the application based on the power consumption status of the application; and
   displaying, by the terminal, the power consumption report of the application,
   wherein the power consumption parameter is a quantity of times that the application regularly wakes up the terminal, and
   wherein the determining the power consumption status of the application comprises:
      determining the application is in a high power consumption state when the quantity of times is greater than or equal to a third threshold.

2. The method according to claim 1, wherein the power consumption report comprises identification information of the application, and
   the power consumption report further comprises one or more pieces of the following information: a power consumption level of the application, an amount of electricity consumed by the application, a percentage of the amount of electricity consumed by the application to a total amount of electricity consumed by the terminal, or description information of a power consumption reason.

3. The method according to claim 1, wherein the power consumption parameter is duration for which the application locks the terminal to be in a waking state, and
   the determining the power consumption status of the application comprises:
   determining the application is in a high power consumption state when the duration is greater than or equal to a fourth threshold.

4. The method according to claim 1, wherein the power consumption parameter is a quantity of times that the application automatically starts, and
   the determining the power consumption status of the application comprises:
   determining the application is in a high power consumption state when the quantity of times is greater than or equal to a fifth threshold.

5. The method according to claim 1, wherein the power consumption parameter is an amount of electricity consumed by a component invoked by the application, and
   the determining the power consumption status of the application comprises:
   determining that the application is in a high power consumption state when the amount of electricity consumed by the component is greater than or equal to a sixth threshold;
   wherein the component comprises at least one of a Global Positioning System module, a mobile communications module, a wireless local area network communications module, or a backlight module.

6. The method according to claim 5, wherein the obtaining the power consumption parameter of the application comprises:
determining duration for which the component is invoked by the application; and
obtaining, according to the duration for which the component is invoked by the application and a preset amount of electricity consumed by the component per unit time, the amount of electricity consumed by the component.

7. The method according to claim 1, wherein the power consumption parameter is an amount of electricity consumed by the system resource invoked by the application, and
the determining the power consumption status of the application comprises:
determining that the application is in a high power consumption state when the amount of electricity consumed by the system resource invoked by the application is greater than or equal to a seventh threshold.

8. The method according to claim 7, wherein the obtaining the power consumption parameter of the application comprises:
determining duration for which the system resource invoked by the application occupies the processing resource and an operating frequency of the processing resource when the processing resource is occupied;
determining, according to a preset correspondence between an operating frequency of the processing resource and an amount of electricity consumed by the processing resource per unit time, the amount of electricity consumed per unit time corresponding to the operating frequency of the processing resource; and
obtaining, according to the duration for which the system resource invoked by the application occupies the processing resource and the amount of electricity consumed per unit time, the amount of electricity consumed by the system resource invoked by the application.

9. The method according to claim 1, wherein the power consumption parameter is a total amount of electricity consumed by all power consuming resources invoked by the application when the application is running.

10. A terminal comprising:
at least one processor; and
at least one memory, the at least one memory comprising instructions that when executed by the at least one processor, cause the terminal to perform, at least, the following:
determining that a current amount of electricity of the terminal is less than or equal to a first threshold, or that a decreasing rate of an amount of electricity of the terminal is greater than or equal to a second threshold;
obtaining, when the current amount of electricity of the terminal is less than or equal to the first threshold or when the decreasing rate of the amount of electricity of the terminal is greater than or equal to the second threshold, a power consumption parameter of an application, wherein the application is installed in the terminal, the power consumption parameter is used to represent information about an amount of electricity consumed by a power consuming resource invoked by the application when the application is in an active execution state within the terminal and when the application is in a background state of the terminal, the power consuming resource comprises at least one of a system resource of the terminal, a component resource of the terminal or a processing resource of the terminal, the component resource is a hardware resource other than a processing resource in the terminal, and the system resource comprises at least one of an operating system resource of the terminal or a platform system resource of the terminal;
determining a power consumption status of the application based on the power consumption parameter;
generating a power consumption report of the application based on the power consumption status of the application; and
displaying the power consumption report of the application,
wherein the power consumption parameter is a quantity of times that the application regularly wakes up the terminal, and
wherein the determining the power consumption status of the application comprises:
determining the application is in a high power consumption state when the quantity of times is greater than or equal to a third threshold.

11. The terminal according to claim 10, wherein the
power consumption report comprises identification information of the application, and
the power consumption report further comprises one or more pieces of the following information: a power consumption level of the application, an amount of electricity consumed by the application, a percentage of the amount of electricity consumed by the application to a total amount of electricity consumed by the terminal, or description information of a power consumption reason.

12. The terminal according to claim 10, wherein the power consumption parameter is duration for which the application locks the terminal to be in a waking state, and
the determining the power consumption status of the application comprises:
determining the application is in a high power consumption state when the duration is greater than or equal to a fourth threshold.

13. The terminal according to claim 10, wherein the power consumption parameter is a quantity of times that the application automatically starts, and
the determining the power consumption status of the application comprises:
determining the application is in a high power consumption state when the quantity of times is greater than or equal to a fifth threshold.

14. The terminal according to claim 10, wherein the power consumption parameter is an amount of electricity consumed by a component invoked by the application, and
the determining the power consumption status of the application comprises:
determining that the application is in a high power consumption state when the amount of electricity consumed by the component is greater than or equal to a sixth threshold;
wherein the component comprises at least one of a Global Positioning System module, a mobile communications module, a wireless local area network communications module, or a backlight module.

15. The terminal according to claim 10, wherein the power consumption parameter is an amount of electricity consumed by the system resource invoked by the application, and
the determining the power consumption status of the application comprises:

determining that the application is in a high power consumption state when the amount of electricity consumed by the system resource invoked by the application is greater than or equal to a seventh threshold.

16. The terminal according to claim 10, wherein the power consumption parameter is a total amount of electricity consumed by all power consuming resources invoked by the application.

\* \* \* \* \*